(12) United States Patent
Sherlock

(10) Patent No.: US 6,892,149 B2
(45) Date of Patent: May 10, 2005

(54) IDENTIFYING DATA LOSS IN A TRANSMISSION SYSTEM

(75) Inventor: Stuart W. Sherlock, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 09/872,275

(22) Filed: May 31, 2001

(65) Prior Publication Data

US 2003/0033099 A1 Feb. 13, 2003

(51) Int. Cl.[7] .............................................. G01S 13/62
(52) U.S. Cl. ........................... 702/66; 702/67; 702/68; 702/69; 702/70; 702/71; 702/79; 702/80; 342/28; 370/468; 455/63.1
(58) Field of Search ................................. 455/302–306, 455/295, 296, 63.1; 375/220; 342/26, 28, 104, 107, 109, 113–115, 118, 134, 139, 146, 147, 175, 195, 141, 159, 202, 203, 204, 101; 702/57–59, 62, 66–71, 79, 80, 84, 106, FOR 103–104, FOR 100, FOR 166, 89, 92; 370/493–495, 503, 468, 508, 509, 510, 512, 516

(56) References Cited

U.S. PATENT DOCUMENTS

| | | | | |
|---|---|---|---|---|
| 4,805,096 A | * | 2/1989 | Crohn | 710/260 |
| 4,952,193 A | * | 8/1990 | Talwar | 455/63.1 |
| 5,123,286 A | * | 6/1992 | Baumgartner | 73/861.27 |
| 5,471,211 A | * | 11/1995 | Randall et al. | 342/26 |
| 5,930,300 A | * | 7/1999 | Betts et al. | 375/285 |
| 6,097,329 A | * | 8/2000 | Wakayama | 342/26 |
| 2002/0015424 A1 | * | 2/2002 | Preston et al. | 370/503 |
| 2002/0130807 A1 | * | 9/2002 | Hall et al. | 342/28 |
| 2003/0076879 A1 | * | 4/2003 | Langford et al. | 375/219 |

FOREIGN PATENT DOCUMENTS

EP 75195 A * 3/1983 ............ A61B/5/02

\* cited by examiner

*Primary Examiner*—Carol S Tsai
(74) *Attorney, Agent, or Firm*—Alan Pedersen-Giles (57) ABSTRACT

Identifying data loss in a transmission system includes shifting one of a received waveform and a transmitted waveform, determining differences between the transmitted and received waveforms at various shift points, and identifying a smallest of the differences between the transmitted and received waveforms. A plot of the differences relative to the shift points may be generated. The smallest of the differences may be a low vertex point on the plot.

27 Claims, 6 Drawing Sheets

(1 of 6 Drawing Sheet(s) Filed in Color)

FIG. 10

US 6,892,149 B2

IDENTIFYING DATA LOSS IN A TRANSMISSION SYSTEM

TECHNICAL FIELD

This invention relates to identifying data loss in a transmission system.

BACKGROUND

Data that is transmitted through a transmission system experiences delays (i.e., latency) between two system end-points, such as a transmitter and a receiver. The data also experiences jitter, which can contribute to delay between end-points. Latency and jitter can result in loss of data.

Data loss is particularly problematic in audio applications. For example, in IP (Internet Protocol) telephony significant data loss can adversely affect resulting audio.

DESCRIPTION OF THE DRAWINGS

The file of this patent contains at least one drawing executed in color. Copies of this patent with color drawings are provided to the Patent and Trademark Office with payment of the necessary fee.

The patent or application file contains at least one drawing executed in color. Copies of this patent application with color drawings will be provided by the U.S. Patent Office and Trademark Office upon request and payment of the necessary fee.

DESCRIPTION

Figure 1:
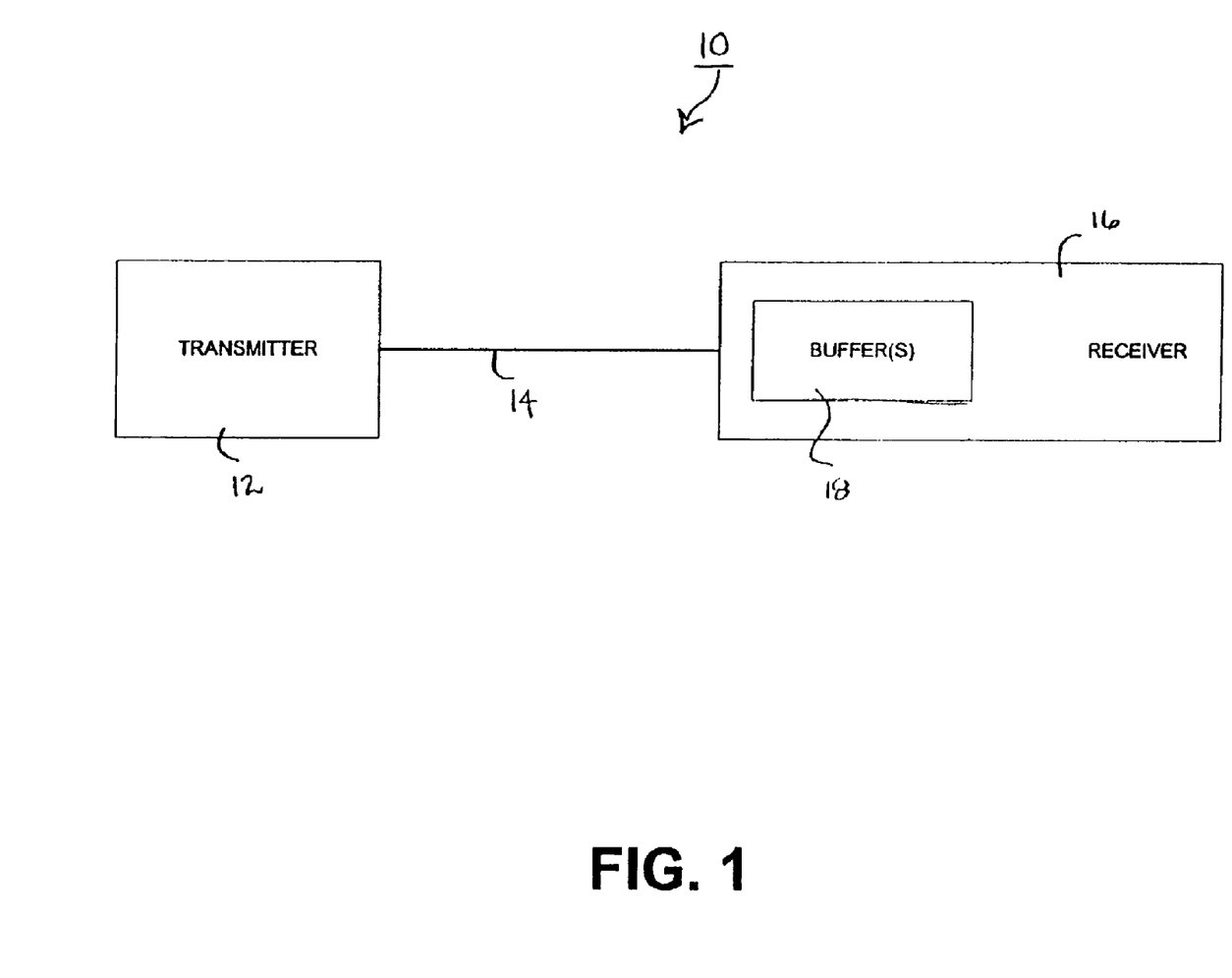
FIG. 1 is block diagram of a transmission system.

FIG. 1 shows a transmission system 10 for transmitting data between two, or more, end-points. Transmission system 10 includes a transmitter 12, a transmission medium 14, and a receiver 16. In this embodiment, transmission medium 14 is a network medium, such as Ethernet; although other types of media may be used. Transmitter 12 and receiver 16 are adapted to transmit and receive, respectively, audio data, such as data for IP telephony. It is noted, however, that other types of data, both audio and non-audio, may be transmitted over transmission system 10 and processed as described below.

Receiver 16 includes buffer(s) 18 for receiving, and buffering, audio data packet(s) prior to playback. These buffer(s) include some type of circuitry for coding/decoding (CODEC) the audio data, if necessary. For example, the buffers may include a G.723 CODEC or an MPEG (Motion Picture Experts Group) CODEC.

Delays typically occur in transmission from transmitter 12 to receiver 16. The delays may occur in the receiver or transmitter themselves, and/or in transmission medium 14. Jitter is known to have significant influence in the amount of delay in the system. The "system-wide" delay adversely affects the quality of the received audio. The delay is referred to as "system-wide" because it encompasses delay from transmitter 12, delay in receiver 16, and jitter in receiver 16, not just delay from transmission medium 14.

Figure 2:
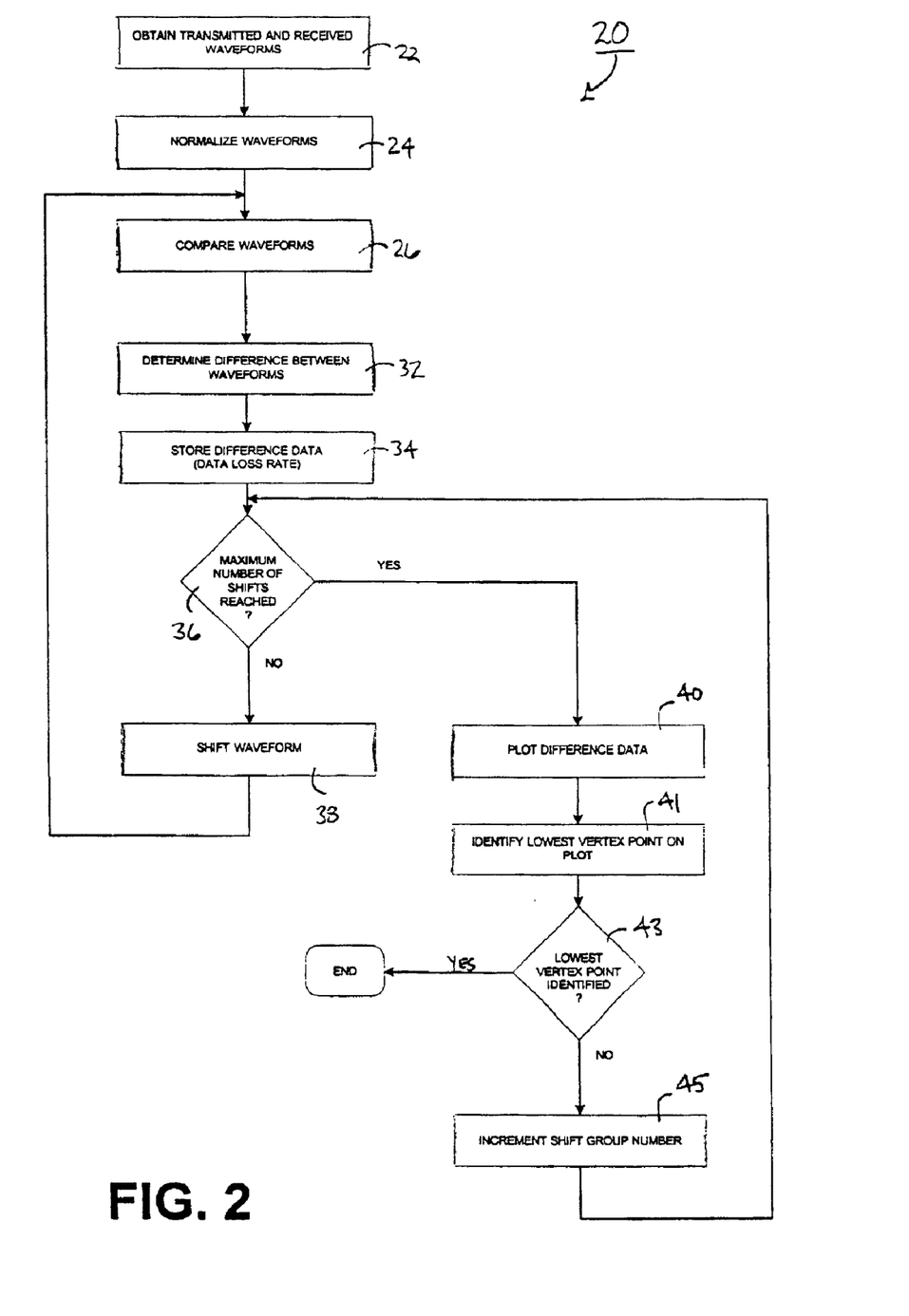
FIG. 2 is a flowchart showing a process for identifying data loss in the transmission system of FIG. 1.

To increase the quality of the received audio, the amount of delay may be reduced and the size of the receiver buffer may be adjusted. FIG. 2 shows a process 20 for detecting the amount of delay in transmission system 10. Process 20 may be performed to test transmission system 10 using "test" audio data, before "real" audio data is transmitted over transmission system 10. Once the amount of delay has been detected, post-processing may be performed to compensate for this delay. The compensation may include varying the receiver buffer size and the amount of traffic permitted on the transmission system. Process 20 may be performed in receiver 16 or in an external computer (not shown in FIG. 1) that can receive data from transmission system 10.

Process 20 obtains (22) a transmitted waveform from transmitter 12 and a received waveform from receiver 16. In this context, the transmitted waveform is the signal that transmitter 12 transmits to receiver 16 over transmission medium 14. The received waveform is the signal that receiver 16 receives from transmitter 12 over transmission medium 14.

Figure 3:
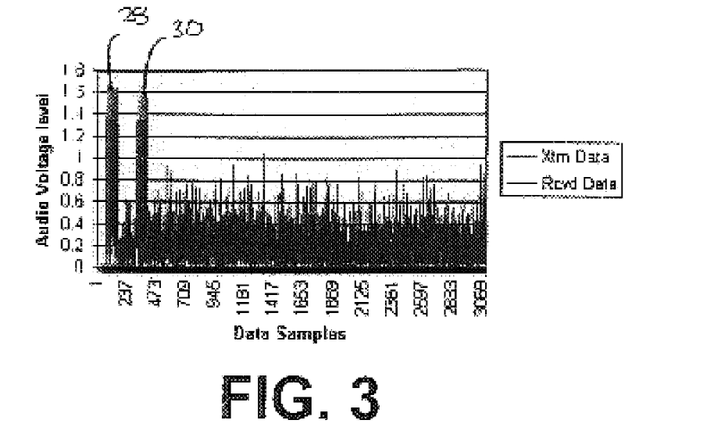
FIG. 3 (color) is a plot of transmitted and received waveforms from the transmission system of FIG. 1.

Process 20 normalizes (24) both the transmitted and received waveforms so that they both contain only positive data. The transmitted and received waveforms are initially aligned as best as possible. Process 20 compares (26) the transmitted and received waveforms. The comparison is performed by superimposing the transmitted waveform 28 and the received waveform 30 (FIG. 3). In the plot of FIG. 3, the transmitted and received waveforms are superimposed with the best possible (at this point) alignment of the received waveform to the transmitted waveform, as described below.

Figure 4:
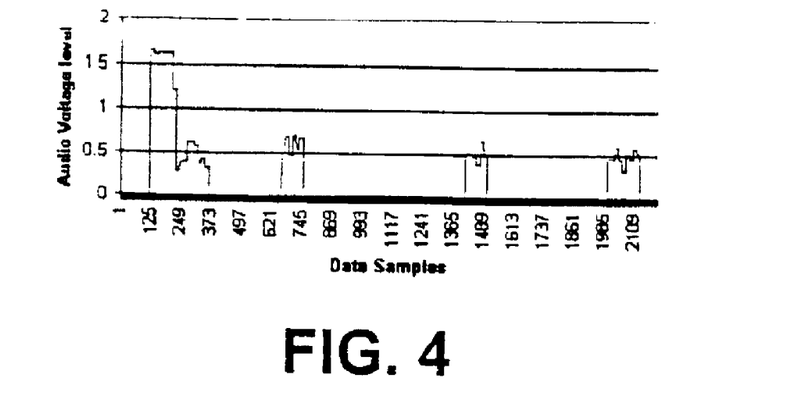
FIG. 4 is a plot showing data differences between the transmitted and received waveforms of FIG. 3.

Process 20 determines (32) the difference between the transmitted waveform 28 and the received waveform 30. For the plot shown in FIG. 3, the difference between the transmitted and received waveforms is shown in the plot of FIG. 4. At this point, process 20 may divide the difference data of FIG. 4 into groups of "envelopes". In this context, an envelope is a portion (e.g., 25%) of the data buffer in the receiver. Process 20 determines and stores (34) the data loss and loss rate (i.e., the percentage of data lost from the transmitted to the received waveform) for each envelope of data.

The "unshifted" comparison of the received waveform 30 and the transmitted waveform 28 constitutes the initial ("$0^{th}$") increment shift. As described in more detail below, process 20 shifts the received waveform relative to the transmitted waveform (or vice versa) in order to find the amount of shift at which the data loss rate is relatively low (e.g., the lowest data loss). Received waveform 30 may be shifted relative to transmitted waveform 28 or, alternatively, transmitted waveform 28 may be shifted relative to received waveform 30. For each shift in the −X direction, there is an equal and corresponding shift of the same waveform in the +X direction. Thus, the number and size of shifts in each direction (e.g., +/−X) is the same. Each pair of shifts constitutes a shift group, such that a shift group (except for the $0^{th}$ shift noted above) has a positive (+X) component and a negative (−X) component. Thus, an odd number of shift points will generally be obtained by process 20. Generally, two pairs of shifts plus the initial shift (for a total of five shift groups) is sufficient to determine a vertex or if added shifting is needed. As described below with respect to FIG. 5, the shifts are plotted against the data loss rate to determine which shift produces the least data loss.

Referring back to FIG. 2, process 20 determines (36) if the desired number of shifts have occurred. The number of shifts in one direction (e.g., −X) may be determined based on the size of a CODEC buffer in receiver 16. Table 1 (below) shows examples of shift group sizes for three well-known CODEC buffers (G.723, G.711 and G.729) used in audio receivers. The shift group sizes of Table 1 are provided both in terms of data samples and milliseconds (msec).

TABLE 1

| CODEC Buffer | Buffer Size In msec | Shift Group Size In msec | Shift Group Size In # Of Data Samples |
|---|---|---|---|
| G.723 | 30 | 5 | 10 |
| G.711 | 120 | 20 | 40 |
| G.729 | 10 | 2 | 4 |

Thus, for the G.723 CODEC buffer, each shift in a shift group is 5 msec covering 10 data samples. Since the CODEC buffer size is 30 msec, there are a total of 6 (=30÷5) shift groups, resulting in a total of 6 shifts in the −X direction and 6 shifts in the +X direction. Similar calculations can be used to obtain the number of shift groups/shifts sizes for each of the other buffers noted in Table 1. Alternatively, the size and number of the shift groups may be set as desired and may or may not be a multiple of the data stored in the buffers.

The minimum number of shift groups for a buffer in receiver 16 is determined beforehand and may be stored, e.g., in a memory of a machine executing process 20. Referring to FIG. 2, if the desired number of shifts have not occurred (which would generally not be the case immediately following the $0^{th}$ shift), process 20 shifts (38) the received waveform relative to the transmitted waveform. In this representative embodiment, received waveform 30 (FIG. 3) is shifted in the −X direction relative to transmitted waveform 28; however, as noted above, transmitted waveform 28 may be shifted instead. Received waveform 30 is shifted because that is the waveform that is delayed through transmission system 10.

Figure 6:
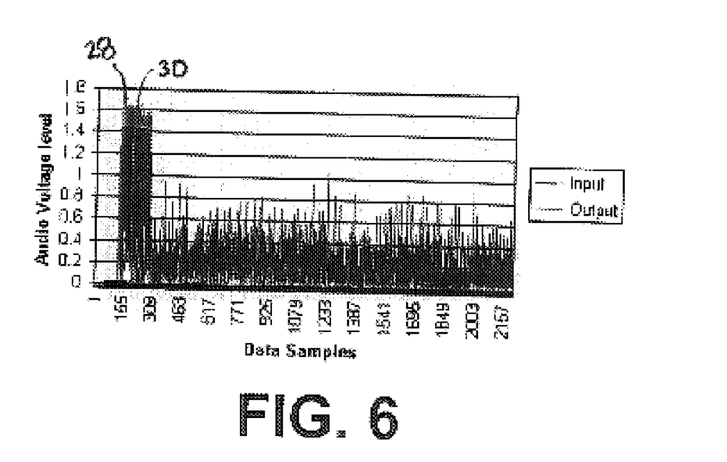
FIG. 6 (color) is a plot of shifted transmitted and received waveforms from the transmission system of FIG. 1.
Figure 7:
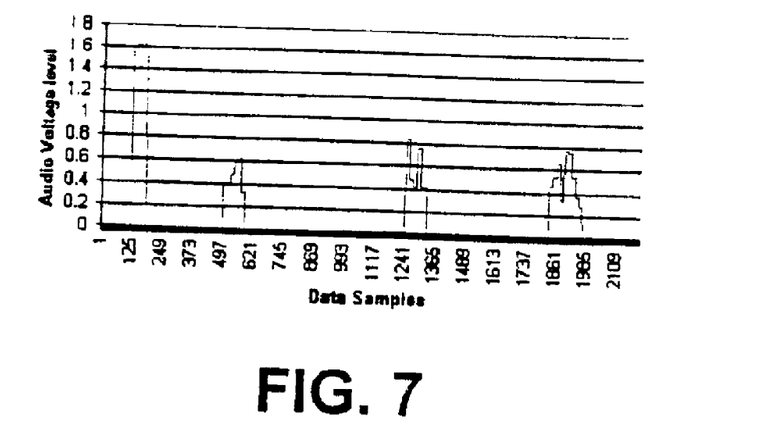
FIG. 7 is a plot showing data differences between the transmitted and received waveforms of FIG. 6.

FIG. 6 shows received waveform 30 shifted relative to transmitted waveform 28. Process 20 compares (26) determines (32) the difference in data after shifting received waveform 30 relative to transmitted waveform 28. This difference is plotted in FIG. 7. Process 20 stores (34) the data loss rate, which corresponds to this difference in, e.g., an array in memory. Process 20 determines (36) if the desired number of shifts has occurred. Assuming that this is not the case, process 20 shifts (38) the transmitted waveform again—this time in the equal and opposite direction as the previous shift in the current shift group, i.e., in the +X direction. Process 20 repeats blocks 26, 32, 34, 36, 38 of FIG. 2 until the number of shifts of waveforms has occurred for the current buffer size and the corresponding data loss rates for the shifts have been stored.

Figure 5:
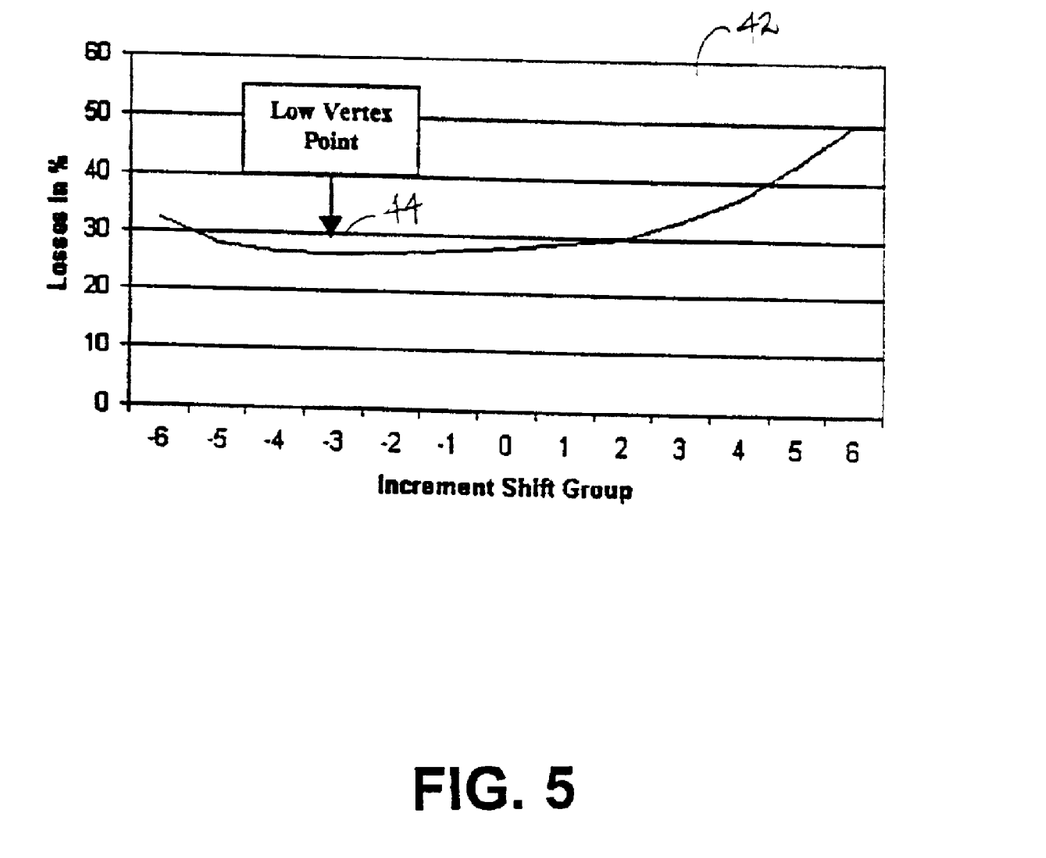
FIG. 5 is a plot showing data loss from various waveforms generated by the process of FIG. 2.
Figure 8:
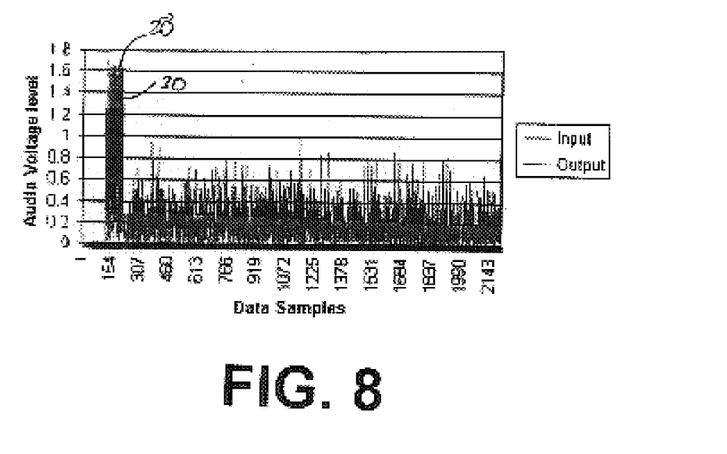
FIG. 8 (color) is a plot of further shifted transmitted and received waveforms from the transmission system of FIG. 1.
Figure 9:
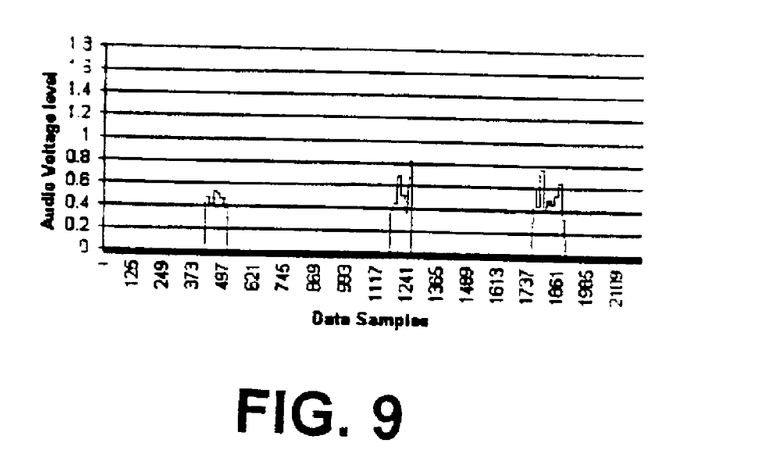
FIG. 9 is a plot showing data differences between the transmitted and received waveforms of FIG. 8.

One of the foregoing shifts may result in a minimum (or, at least, reduced) data loss rate between the two waveforms. The shift that produces this effect in the current example is shown in FIG. 8, with the data loss rate for that shift being plotted in FIG. 9. Process 20 identifies the shift that produces a minimum difference by comparing the data loss rates stored in the array in memory. In this embodiment, process 20 plots (40) the data loss rates (i.e., differences in data) for each shift in each increment shift group. FIG. 5 shows the plot 42 generated for this example. Process 20 identifies (41) a lowest vertex point 44 on the plot. The lowest vertex point 44 corresponds to the shift at which the least amount of data is lost between the transmitted and received waveforms. The least data loss constitutes the smallest difference in data between the transmitted and received waveforms.

If a vertex in the plot has not been reached (43) (e.g., if the plot is an increasing function and not parabolic), process 20 increments (45) the number of shift groups. That is, process 20 adds two shift groups, resulting in two more shifts in both the −X and +X directions. Process 20 then returns to 36, whereafter the process continues until a lowest vertex point is obtained.

As shown in FIG. 5, the shift that corresponds to the lowest vertex point 44 on plot 42 is the "−3" shift, i.e., the shift in the −X direction for the third shift group. Knowing that this shift produces the minimum difference, receiver 16 can be programmed to implement this shift on all "non-test" audio data that it receives from transmitter 12 over transmission medium 14. By implementing this shift, the amount of data loss in the audio data can be reduced, thus providing audio with less noise and higher fidelity.

Figure 10:
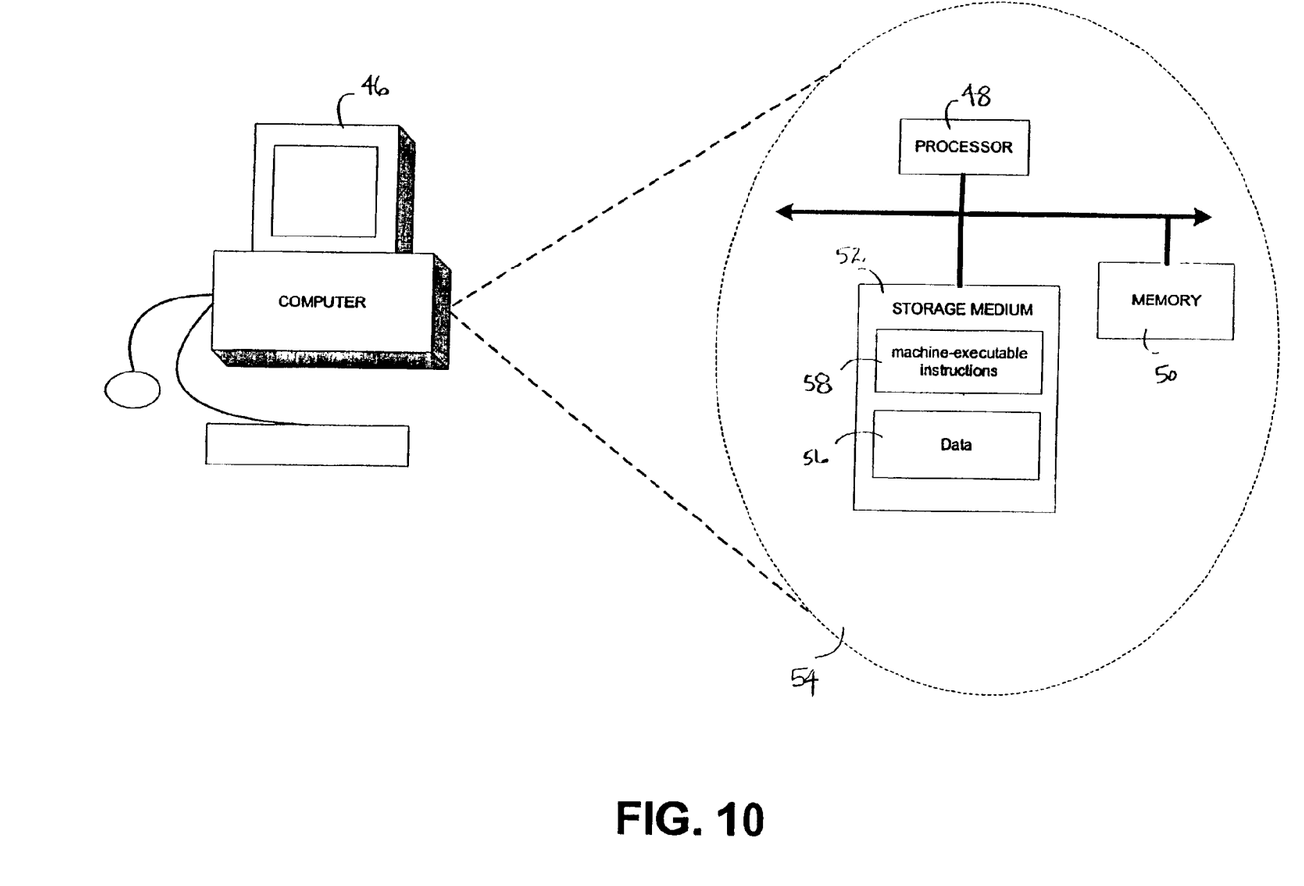
FIG. 10 is a block diagram of a computer on which the process of FIG. 2 may be implemented.

FIG. 10 shows a computer 46 on which process 20 may be implemented. Computer 46 includes a processor 48, a memory 50, and a storage medium 52 (see view 54). Storage medium 52 contains a buffer for storing received "test" audio data 56 and machine-executable instructions 58 that are executed by processor 48 out of memory 50 to perform process 20 on data 56. The components of computer 46 may be located in receiver 16 in order to perform process 20 in receiver 16.

Process 20, however, is not limited to use with the hardware and software of FIG. 10. It may find applicability in any computing or processing environment. Process 20 may be implemented in hardware, software, or a combination of the two. Process 20 may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform process 20 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium/article (e.g., CD-ROM, hard disk, or magnetic diskette) that is readable by a general or special purpose programmable computer for configuring and operating the computer when the storage medium or device is read by the computer to perform process 20. Process 20 may also be implemented as a machine-readable storage medium, configured with a computer program, where, upon execution, instructions in the computer program cause a machine to operate in accordance with process 20.

The invention is not limited to the specific embodiments described above. For example, process 20 is not limited to use with audio data. It can be used with video or any other type of streaming data where alignment and time considerations affect the quality of the resulting output. Process 20 is not limited to use with any type of transmission medium or network. For example, process 20 may be used with ATM (Asynchronous Transfer Mode) networks, LANs (Local Area Networks), WANs (Wide Area Networks), or any other network. Process 20 is not limited to use with audio transmitters and receivers (or computers) such as those shown in the figures. It may be performed on any one or more machines having access to transmitted and received waveforms.

The blocks shown in FIG. 2 merely represent one way that process 20 may be ordered. The blocks may be reordered, if desired, to perform the same function. For example, process 20 can be extended to account for a case where a lowest vertex is not identified given the desired number of shifts. In this case, for example, the number of shifts/shift groups may be adjusted until a lowest vertex is identified. That is, additional data (e.g., an additional data envelope) may be obtained from the buffer and additional shift groups (e.g., two at a time) may be added until the lowest vertex point is identified for the two waveforms. Knowledge of the CODEC buffer size is helpful in determining the shift sizes.

The attached Appendix shows pseudo-code for implementing one embodiment of process 20.

Other embodiments not described herein are also within the scope of the following claims.

APPENDIX

```
Process the transmitted and received audio waveforms:
    (a) normalize the transmitted and received audio
        waveforms so that they contain only positive data
    (b) superimpose/align the normalized waveforms
    (c) divide the calculated difference data into groups of
        envelopes, set the envelope width to 25% of the
        audio CODEC buffer size (an audio packet would be
        four consecutive envelopes)
    (e) summarize the enveloped data and determine the data
        losses and loss rate
Shift, alternatively, the transmitted (or received) audio data
as follows until the lowest point vertex is determined
    WHERE    start_Shift=1
             range_Shift=4 (to acquire a minimum of five
                 empirical values including the initial
                 data loss value, 0ᵗʰ shift group)
             shiftGroupSize=defined for CODEC being used
    WHILE NO Vertex
        For shift=start_Shift to range_Shift
        (a)  set shift_Increment_Direction=
             (shiftSize+(-shift* (((-1)ˢʰⁱᶠᵗ)))
        (b)  set shiftSize=shift_Increment_Direction *
             shiftGroupSize
        (c)  shift waveform by shiftSize
        (d)  obtain difference by subtracting the
             transmitted waveform from the received waveform
        (e)  divide the calculated difference data into
             groups of envelopes, set the envelope width to
             25% of the audio CODEC buffer size (an audio
             packet would be four consecutive envelopes)
        (f)  summarize the enveloped data and determine the
             data losses and loss rate
        (g)  store data loss rate in array
    Analyze the collected data loss rate data from the array to
    find the lowest vertex point
        If no vertex is identified, then
        (a)  change the start_Shift and range_Shift for two
             additional shifts and loss calculation data
             points:
                 start_Shift=range_Shift+1
                 range_Shift=range_Shift+2
```

APPENDIX-continued

```
        Else
             Found Vertex - Conclude shifting process
        End if
    End While Loop
Extract the optimum data loss and associated frequency for
final result
```

What is claimed is:

1. A method of identifying data loss in a transmission system, comprising:

shifting one of a received waveform and a transmittal waveform, the transmitted waveform being a first signal that is transmitted from a transmitter to a receiver over a transmission medium, the received waveform being a second signal that is received by the receiver from the transmitter over the transmission medium;

determining differences between the transmitted and received waveforms at various shift points;

identifying a smallest of the differences between the transmitted and received waveforms; and generating a plot of the differences relative to the shift points;

wherein the smallest of the differences comprises a low vertex point on the plot.

2. The method of claim 1, wherein shifting comprises:

moving the transmitted waveform relative to the received waveform in a first direction; and moving the transmitted waveform relative to the received waveform in a second direction.

3. The method of claim 1, wherein shifting comprises:

moving the received waveform relative to the transmitted waveform in a first direction; and moving the received waveform relative to the transmitted waveform in a second direction.

4. The method of claim 1, wherein an odd number of shift points make up a plot.

5. The method of claim 1, further comprising:

normalizing the transmitted and received waveforms so that the transmitted and received waveforms contain positive data.

6. The method of claim 1, wherein the transmitted and received waveforms comprise audio data.

7. The method of claim 1, wherein the transmission system comprises the transmitter, the transmission medium, and the receiver.

8. The method of claim 1, wherein the shift points are defined in terms of time in the transmitted and received waveforms.

9. The method of claim 1, wherein the shift points are defined in terms of data samples in the transmitted and received waveforms.

10. An article comprising a machine-readable medium that stores executable instructions for identifying data loss in a transmission system, the instructions causing a machine to:

shift one of a received waveform and a transmitted waveform, the transmitted waveform being a first signal that is transmitted from a transmitter to a receiver over a transmission medium, the received waveform being a second signal that is received by the receiver from the transmitter over the transmission medium;

determine differences between the transmitted and received waveforms at various shift points;

identify a smallest of the differences between the transmitted and received waveforms; and generate a plot of the differences relative to the shift points;

wherein the smallest of the differences comprises low vertex point on the plot.

11. The article of claim 10, wherein shifting comprises:

moving the transmitted waveform relative to the received waveform in a first direction; and moving the transmitted waveform relative to the received waveform in a second direction.

12. The article of claim 10, wherein shifting comprises:

moving the received waveform relative to the transmitted waveform in a first direction; and moving the received waveform relative to the transmitted waveform in a second direction.

13. The article of claim 10, wherein an odd number of shift points make up a plot.

14. The article of claim 10, further comprising instructions that cause the machine to:

normalize the transmitted and received waveforms so that the transmitted and received waveforms contain positive data.

15. The article of claim 10, wherein the transmitted and received waveforms comprise audio data.

16. The article of claim 10, wherein the transmission system comprises the transmitter, the transmission medium, and the receiver.

17. The article of claim 10, wherein the shift points are defined in terms of time in the transmitted and received waveforms.

18. The article of claim 10, wherein the shift points are defined in terms of data samples in the transmitted and received waveforms.

19. An apparatus for identifying data loss in a transmission system, comprising:

a memory that stores executable instructions; and a processor that executes the instructions to:

shift one of a received waveform and a transmitted waveform, the transmitted waveform being a first signal that is transmitted from a transmitter to a receiver over a transmission medium, the received waveform being a second signal that is received by the receiver from the transmitter over the transmission medium;

determine differences between the transmitted and received waveforms at various shift points;

identify a smallest of the differences between the transmitted and received waveforms; and generate a plot of the differences relative to the shift points;

wherein the smallest of the differences comprises a low vertex point on the plot.

20. The apparatus of claim 19, wherein shifting comprises:

moving the transmitted waveform relative to the received waveform in a first direction; and moving the transmitted waveform relative to the received waveform in a second direction.

21. The apparatus of claim 19, wherein shifting comprises:

moving the received waveform relative to the transmitted waveform in a first direction; and moving the received waveform relative to the transmitted waveform in a second direction.

22. The apparatus of claim 19, wherein an odd number of shift points make up a plot.

23. The apparatus of claim 19, wherein the processor executes instructions to:

normalize the transmitted and received waveforms so that the transmitted and received waveforms contain positive data.

24. The apparatus of claim 19, wherein the transmitted and received waveforms comprise audio data.

25. The apparatus of claim 19, wherein the transmission system comprises the transmitter and the transmission medium, and the apparatus comprises the receiver that is capable of receiving the received waveform over the transmission medium.

26. The apparatus of claim 19, wherein the shift points are defined in terms of time in the transmitted and received waveforms.

27. The apparatus of claim 19, wherein the shift points are defined in terms of data samples in the transmitted and received waveforms.

* * * * *